United States Patent
Yoo et al.

(10) Patent No.: US 12,420,254 B2
(45) Date of Patent: Sep. 23, 2025

(54) CONDUCTIVE HYDROGEL CONTAINING METAL-ORGANIC FRAMEWORK AND PREPARATION METHOD THEREOF

(71) Applicant: KOREA UNIVERSITY OF TECHNOLOGY AND EDUCATION INDUSTRY—UNIVERSITY COOPERATION FOUNDATION, Cheonan-si (KR)

(72) Inventors: Hyeong Min Yoo, Cheonan-si (KR); Luqman Ali Shah, Peshawar (PK); Mansoor Khan, Peshawar (PK)

(73) Assignee: KOREA UNIVERSITY OF TECHNOLOGY AND EDUCATION INDUSTRY-UNIVERSITY COOPERATION FOUNDATION, Cheonan-si (KR)

(*) Notice: Subject to any disclaimer, the term of this patent is extended or adjusted under 35 U.S.C. 154(b) by 75 days.

(21) Appl. No.: 18/399,971

(22) Filed: Dec. 29, 2023

(65) Prior Publication Data
US 2025/0170546 A1  May 29, 2025

(30) Foreign Application Priority Data
Nov. 23, 2023 (KR) .......... 10-2023-0163898

(51) Int. Cl.
C07F 3/06  (2006.01)
B01J 13/00  (2006.01)

(52) U.S. Cl.
CPC ............ B01J 13/0065 (2013.01); C07F 3/06 (2013.01)

(58) Field of Classification Search
CPC .......... B01J 13/0065; C07F 3/06; C08J 3/075; C08J 3/24; A61B 5/266; C08K 9/04; C08K 9/10; H01B 1/121; H01B 5/00
See application file for complete search history.

(56) References Cited

U.S. PATENT DOCUMENTS

| | | | |
|---|---|---|---|
| 11,918,658 B2* | 3/2024 | Godfrin | B01J 13/0052 |
| 2015/0225438 A1* | 8/2015 | Johnson | C08G 83/008 |
| | | | 435/375 |
| 2019/0231265 A1* | 8/2019 | López-Barrón | A61B 5/0002 |
| 2024/0167087 A1* | 5/2024 | Glezer | C12Q 1/6874 |

OTHER PUBLICATIONS

Qunmeng Xia et al., "Metal-organic framework (MOF) facilitated highly stretchable and fatigue-resistant ionogels for recyclable sensors", The Royal Society of Chemistry, 2022, 9, pp. 2881-2892.

* cited by examiner

Primary Examiner — Mark Kopec
Assistant Examiner — Jaison P Thomas
(74) Attorney, Agent, or Firm — Sughrue Mion, PLLC (57) ABSTRACT

Proposed is a conductive hydrogel including a micelle and a metal-organic framework/surfactant composite.

8 Claims, 10 Drawing Sheets

CONDUCTIVE HYDROGEL CONTAINING METAL-ORGANIC FRAMEWORK AND PREPARATION METHOD THEREOF

CROSS REFERENCE TO RELATED APPLICATION

This application claims priority from and benefit of Korean Patent Application No. 10-2023-0163898, filed on Nov. 23, 2023, which is hereby incorporated by reference for all purposes as if fully set forth herein.

BACKGROUND OF THE DISCLOSURE

1. Field of the Disclosure

The present disclosure relates to a conductive hydrogel containing a metal-organic framework and a method of preparing the same.

2. Description of the Related Art

Flexible strain sensors and electronic sensors are receiving significant attention for their potential applications in a wide range of areas, including electric skin, human movement detection, health information monitoring, and energy storage. These sensors can identify both biological and mechanical activities and transmit feedback through changes in electrical output. Accordingly, various sensor materials such as carbon, nanowires, and conductive polymers have been designed. However, these wearable sensors may experience limited operating ranges, long response times, and conductivity degradation due to repeated deformation, which poses obstacles to developing more complex and adaptable wearable devices. Accordingly, there is a need to develop flexible sensors that can maintain high conductivity even after repeated deformation.

Hydrogels, which are a type of flexible water-based material, are one of the polymer materials suitable for wearable sensors due to their excellent biocompatibility and improved elasticity. To prepare hydrogels suitable for various applications, various types of hydrogels are under research and development by studying chemical cross-linking, the use of polyethylene glycol, and the creation of double-network hydrogels. However, for hydrogels to be suitable for flexible sensors, hydrogels are required to have high mechanical elasticity and self-recovery capabilities. Accordingly, researchers have continued their efforts to develop hydrogels with rapid self-recovery capabilities and excellent toughness by incorporating non-covalent bonds such as ionic bonds, hydrogen bonds, and hydrophobic bonds into material matrices. Among the hydrogels under research and development, a composite hydrogel exhibits excellent elongation and can improve electrical conductivity by including conductive nanoparticles. Among the conductive nanoparticles, scale fillers such as hydroxide and montmorillonite exhibit high hydrophilicity and bind to the hydrogel through electrostatic attraction force and hydrogen bonding. However, due to the presence of water in the hydrogel network, this interaction is relatively weak, resulting in a composite hydrogel with low mechanical stiffness and pronounced hysteresis.

According to recent research, some materials contain carbon nanotubes, graphene, and metal-organic frameworks (MOFs) as fillers of the materials to form conductivity in hydrogels. The materials have excellent electrical and mechanical properties, thereby the materials are under research and development on how to apply to hydrogels. Among these materials, metal-organic frameworks are receiving special attention from researchers due to their high porosity and large surface area. However, these metal-organic frameworks have hydrophobic properties and have difficulty in achieving uniform dispersion in water and within the hydrogel network. To solve this problem, a method of introducing a hydrophilic functional group to the metal-organic frameworks by treating the metal-organic framework at high temperature has been designed, but in this case, there is a limitation that the structure and properties of the metal-organic frameworks may change. Accordingly, at the moment, there is a need for the development of a metal-organic framework/hydrogel composite in which the metal-organic framework can be uniformly dispersed within the hydrogel, exhibits high durability against repeated mechanical changes, and can exhibit high reliability by lowering hysteresis.

RELATED ART DOCUMENT

Non-Patent Document (Non-Patent Document 1) Materials Horizons, 2022, 9, 2881-2892 titled "Metal-organic framework (MOF) facilitated highly stretchable and fatigue-resistant ionogels for recyclable sensors"

BACKGROUND OF THE DISCLOSURE

The present disclosure aims to provide a conductive hydrogel that does not cause aggregation of a metal-organic framework within the hydrogel, exhibits high electrical conductivity, has excellent mechanical properties including multiple dynamic cross-linking points, and exhibits high durability even after repeated deformation.

The present disclosure also aims to provide a conductive hydrogel that exhibits high sensitivity and reliability when applied to sensors.

A conductive hydrogel according to the present disclosure includes: a micelle with an acrylic monomer trapped inside the micelle; and a metal-organic framework/surfactant composite.

The conductive hydrogel according to one embodiment of the present disclosure may contain an acrylic bond.

The conductive hydrogel according to one embodiment of the present disclosure may include a structure in which a hydrogel chain and the acrylic monomer inside the micelle are polymerized.

The conductive hydrogel according to an embodiment of the present disclosure may have the acrylic monomer inside the micelle, the acrylic monomer containing an alkyl group having 6 to 20 carbon atoms.

In the conductive hydrogel according to an embodiment of the present disclosure, the metal-organic framework may include a metal ion and an organic linker, and the organic linker may have a hydrogel binding structure and an electrostatic attraction force.

The conductive hydrogel according to one embodiment of the present disclosure may have electrical conductivity in a range of 0.8 S/cm or more.

A method of preparing a conductive hydrogel, according to the present disclosure, includes: mixing a surfactant and a hydrophobic acrylic monomer to prepare a solution of a composite micelle in which the acrylic monomer is trapped; adding a metal-organic framework to the solution; and adding and curing an ionic acrylic monomer, acrylamide, and a gel-forming agent to the resulting solution prepared through the adding of the metal-organic framework.

In the preparation method of the conductive hydrogel according to an embodiment of the present disclosure, the hydrophobic acrylic monomer contains an alkyl group having 6 to 20 carbon atoms.

In the preparation method of the conductive hydrogel according to an embodiment of the present disclosure, the surfactant may be a cationic surfactant, an anionic surfactant, or an amphoteric surfactant.

In the preparation method of the conductive hydrogel according to an embodiment of the present disclosure, the cationic surfactant may be a quaternary ammonium-based surfactant.

In the preparation method of the conductive hydrogel according to an embodiment of the present disclosure, the anionic surfactant includes one or at least two selected from among carboxylic acid-based surfactants, sulfonate-based surfactants, sulfate-based surfactants, and sulfosuccinate-based surfactants.

In the preparation method of the conductive hydrogel according to an embodiment of the present disclosure, the mixing may further involve adding a water-soluble salt to promote the formation of composite micelles.

In the preparation method of the conductive hydrogel according to an embodiment of the present disclosure, the mixing may involve adding 0.1 g to 1 g of hydrophobic acrylic monomer per 1 g of the surfactant.

In the preparation method of the conductive hydrogel according to an embodiment of the present disclosure, the metal-organic framework may be added in an amount of 10 mg to 100 mg per 1 g of the surfactant.

In the preparation method of the conductive hydrogel according to an embodiment of the present disclosure, the metal-organic framework includes a metal and an organic linker, and the ionic acrylic monomer is cationic when the organic linker is anionic, and the ionic acrylic monomer is anionic when the organic linker is cationic.

In the preparation method of the conductive hydrogel according to an embodiment of the present disclosure, in the adding and curing, 0.5 g to 7 g of the acrylamide may be added per 1 g of the surfactant.

The present disclosure also provides a sensor, the sensor containing a conductive hydrogel according to one embodiment of the present disclosure.

The sensor may have a gauge factor (GF) value in a range of 13 or more at strain rates ranging from 0% to 900%.

A conductive hydrogel according to the present disclosure includes: the micelle with the acrylic monomer trapped inside the micelle; and the metal-organic framework/surfactant composite; thus the conductive hydrogel exhibits high electrical conductivity while preventing aggregation of the metal-organic framework therewithin, and has excellent mechanical properties including multiple dynamic cross-linking points, and is resistant to repeated deformation. In addition, the hydrogel applied to a sensor has the advantage of high sensitivity and reliability.

BRIEF DESCRIPTION OF THE DRAWINGS

A to F of FIG. 1 schematically illustrate the structure of a conductive hydrogel before and after polymerization according to an embodiment of the present disclosure.

A to G of FIG. 2 illustrate the mechanical properties of the conductive hydrogel according to an embodiment of the present disclosure observed with the naked eye.

A to G of FIG. 3 illustrate the results of quantitatively measuring the mechanical properties of the conductive hydrogel according to an example of the present disclosure.

A to C of FIG. 4 illustrate the results of measuring the rheological properties of the conductive hydrogel according to an example of the present disclosure.

A to G of FIG. 6 illustrate the results of observing the deformation properties of the conductive hydrogel according to an example of the present disclosure; and A to F of FIG. 7, A to F of FIG. 8, A to E of FIG. 9 and A to K of FIG. 10 illustrate sensor measurement results after applying the conductive hydrogel according to an embodiment of the present disclosure to the sensor.

DESCRIPTION OF THE PREFERRED EMBODIMENTS

The advantages and features of the embodiments of the present disclosure and methods to achieve the advantages and features will become clear by referring to the embodiments described in detail below along with the accompanying drawings. However, the present disclosure is not limited to the embodiments disclosed below and may be implemented in various forms. The present embodiments are merely provided to ensure that the disclosure is complete and to be understood by those skilled in the art and also provided to fully inform those who have the scope of the disclosure. The present disclosure is only defined by the scope of the claims. Like reference numerals refer to like elements throughout the specification.

In describing embodiments of the present disclosure, when a detailed description of a known function or configuration is judged to unnecessarily obscure the gist of the present disclosure, the detailed description will be omitted. The terms described below are terms defined in consideration of functions in the embodiments of the present disclosure and may vary depending on the intention or custom of the user or operator. Therefore, the definition should be made based on the contents throughout this specification.

A conductive hydrogel according to the present disclosure includes: a micelle with an acrylic monomer trapped inside the micelle; and a metal-organic framework/surfactant composite. The conductive hydrogel according to the present disclosure includes the micelle containing acrylic monomer; and the metal-organic framework (MOF)-surfactant, thereby the conductive hydrogel has excellent conductivity and maintains excellent sensing ability even after wide deformation sensitivity and repeated use when applied to a sensor.

Conventionally known metal-organic frameworks have low water dispersibility, so aggregation may occur when the conventional metal-organic frameworks are mixed with hydrophilic materials such as hydrogels. As a result, the electrical conductivity of the entire hydrogel may decrease and the metal-organic frameworks may be separated upon repeated use due to aggregation.

On the other hand, the conductive hydrogel according to the present disclosure contains a micelle with an acrylic monomer trapped inside and a metal-organic framework/surfactant composite, so the dispersibility of the metal-organic framework is significantly improved, and dynamic cross-linking points are formed inside the micelle. Thus, the conductive hydrogel has excellent mechanical strength even after repeated use and high sensitivity when applied to sensors.

Specifically, the conductive hydrogel is polymerized by containing an acrylic material. The conductive hydrogel may include an acrylic bond, and the hydrogel may include a structure in which the main chain of the hydrogel and acrylic monomer trapped inside the micelle are polymerized. Accordingly, the micelle serves as dynamic cross-linking points, and excellent physical properties can be maintained even after repeated deformation.

The micelle may be formed by a surfactant in a polar solvent such as water and is formed by trapping the hydrophobic acrylic monomer inside. When preparing the hydrogel, the acrylic monomer inside the micelle is polymerized to form dynamic cross-linking points of the micelles. At this time, the acrylic monomer trapped inside the micelle may be an acrylic monomer containing an alkyl group having 6 to 20 carbon atoms, and accordingly, the monomer can be trapped inside the micelle due to the monomer's strong hydrophobicity.

The metal-organic framework includes a metal ion and an organic linker. The organic linker and the hydrogel bonding structure of the framework may have an electrostatic attraction force. Specifically, the hydrogel may be polymerized including an ionic monomer, and the organic linker and the ionic monomer included in the hydrogel bonding structure may interact electrostatically. At this time, when the organic linker is an anionic material, the ionic monomer may be cationic, and when the organic linker is a cationic material, the ionic monomer may be anionic. Through this electrostatic interaction, the dispersion stability of the metal-organic framework can be further improved.

At this time, the metal ion may be lithium, sodium, potassium, rubidium, beryllium, magnesium, calcium, strontium, barium, scandium, yttrium, titanium, zirconium, hafnium, vanadium, neodymium, tantalum, chromium, molybdenum, tungsten, Manganese, iron, and rubidium. It may be a metal ion such as osmium, cobalt, ruthenium, iridium, nickel, lead, platinum, copper, silver, zinc, cadmium, tin, germanium, or cobalt ions, and preferably may include a zinc ion.

The organic linker may include a carboxyl group, a carboxylic acid anionic group, an amine group, an amino sulfonic acid group, or a sulfonic acid anion group. Specifically, the organic linker may contain a substance selected from 1,3,5-benzenetricarboxylic acid, ethanethionic acid, propanedioic acid, 2,5-dihydroxy terephthalic acid, butanedionic acid, phthalic acid, 1H-1,2,3-triazole, and 1H-1,2,4-triazole.

The conductive hydrogel according to an embodiment of the present disclosure may contain 0.1 g to 1 g, preferably 0.1 g to 0.8 g, and more preferably 0.2 g to 0.5 g of hydrophobic acrylic monomer per 1 g of surfactant. At this time, the surfactant refers to the total of the surfactant which is used to form a micelle and the surfactant which is used to form the surfactant-metal organic framework. The metal-organic framework can be added in an amount of 10 mg to 100 mg, preferably 20 mg to 50 mg, per 1 g of surfactant, and within this range, the metal-organic framework can exhibit excellent mechanical properties and high electrical conductivity.

The hydrogel base included in the conductive hydrogel may be prepared by polymerizing acrylamide. Specifically, the acrylamide may be included in an amount of 0.5 g to 1 g, specifically 1.5 g to 5 g, and more specifically 2.5 g to 4 g per 1 g of surfactant, and ionic monomer may be added in an amount of 5 μl to 300 μl per 1 g of surfactant, preferably 100 μl to 250 μl, thereby the dispersion stability of the metal-organic framework can be improved while preventing changes in the physical properties of the entire hydrogel.

As described above, the conductive hydrogel can exhibit high electrical conductivity due to the significantly increased dispersibility of the metal-organic framework. Specifically, the conductive hydrogel has satisfactory electrical conductivity in the range of 0.8 S/cm or more, specifically 0.85 S/cm to 1 S/cm, and more specifically 0.87 S/cm to 0.95 S/cm, thereby securing high sensitivity when applied to sensors.

The present disclosure also provides a method of preparing a conductive hydrogel. A method of preparing the conductive hydrogel according to the present disclosure includes: mixing a surfactant and a hydrophobic terminated acrylic monomer to prepare a solution of a composite micelle in which the acrylic monomer is trapped;
    adding a metal-organic framework to the solution; and
    adding and curing an acrylic monomer, acrylamide, and
       an initiator to the resulting solution prepared through
       the adding of a metal-organic framework.

The conductive hydrogel prepared by the conductive hydrogel preparation method according to the present disclosure uses the surfactant to form the composite micelle with the acrylic monomer trapped inside the composite micelle, and the composite micelle can serve as dynamic cross-linking points after cross-linking. In addition, the surfactant improves the dispersibility of the metal-organic framework, so the hydrogel exhibits uniform electrical conductivity after preparation.

The mixing involves mixing water with the surfactant and the hydrophobic acrylic monomer to prepare the composite micelle solution in which the hydrophobic acrylic monomer is trapped. The water used at this time may be distilled water, ultrapure water, or deionized water, but not limited thereto.

The surfactant can specifically be a cationic surfactant, an anionic surfactant, or an amphoteric surfactant. The cationic surfactant can be a quaternary ammonium-based surfactant, and the anionic surfactant can be one or at least two selected from among carboxylic acid-based surfactants, sulfonate-based surfactants, sulfate-based surfactants, and sulfosuccinate-based surfactants.

In addition, the hydrophobic acrylic monomer may include an alkyl group having 6 to 20 carbon atoms. By including this alkyl group, the acrylic monomer exhibits strong hydrophobicity, and may be trapped in the micelle of the surfactant in an aqueous solution to form the composite micelle.

Specifically, 1 g of the surfactant may contain 0.1 g to 1 g of hydrophobic acrylic monomer, specifically 0.1 g to 0.8 g, and more specifically 0.2 g to 0.5 g of hydrophobic acrylic monomer. Accordingly, the hydrophobic acrylic monomer is trapped within the micelle. Thus, it is possible to prevent the problem of hydrophobic acrylic monomer being separated and aggregated separately, causing a decrease in the physical properties of the entire hydrogel. The mixing can be carried out in 10 g to 35 g of water, preferably 12 g to 25 g of water per 1 g of surfactant, and the composite micelle in sufficient concentration can be formed within this range.

The mixing may further involve adding a water-soluble salt to promote the formation of the composite micelle in which the water-soluble salt is one or at least two selected from lithium chloride, sodium chloride, potassium chloride, lithium bromide, sodium bromide, and potassium bromide. At this time, the water-soluble salt can be added in an amount of 0.1 g to 0.7 g, preferably 0.2 g to 0.5 g, per 1 g of surfactant to promote composite micelle formation while minimizing the effect causing changes on the overall physical properties and polymerization of the hydrogel.

The adding of the metal-organic framework to the solution involves adding the metal-organic framework to the composite micelle solution prepared in the mixing. Specifically, the metal-organic framework is added in an amount of 10 mg to 100 mg, preferably 20 mg to 50 mg, and even more preferably 27 mg to 40 mg per 1 g of surfactant. The hydrogel prepared by satisfying this range exhibits excellent mechanical properties while ensuring high electrical conductivity.

In the method of preparing a conductive hydrogel, the adding and curing involves adding the ionic acrylic monomer, acrylamide, and a gel-forming agent to the reactor after the adding of the metal-organic framework to the solution and curing the mixture. In the adding and curing, acrylamide can be added in an amount of 0.5 g to 7 g, preferably 1.5 g to 5 g, per 1 g of surfactant. Within this range, the acrylamide can promote gel formation and form a hydrogel with excellent physical properties.

Specifically, the ionic acrylic monomer added in the adding and curing may exhibit cationic properties when the organic linker included in the metal-organic framework is anionic, and the ionic acrylic monomer may exhibit anionic properties when the organic linker is cationic. Accordingly, the acrylic monomer and the metal-organic framework can be combined through electrostatic attraction force, and thus the dispersibility of the metal-organic framework can be significantly improved. Furthermore, when the organic linker included in the metal-organic framework is anionic, a cationic surfactant can be used, and when the organic linker is cationic, an anionic surfactant can be used to further improve the dispersibility of the metal-organic framework.

The ionic monomer can be added in an amount of 50 µl to 300 µl, preferably 100 µl to 250 µl, per 1 g of surfactant, and by satisfying this range, the ionic monomer can increase the stability of the metal-organic framework without causing changes in the physical properties of the entire hydrogel.

The present disclosure also provides a sensor, the sensor being able to contain the conductive hydrogel according to one embodiment of the present disclosure. As described above, the conductive hydrogel can maintain excellent reliability even after repeated deformation and can detect movements even in a wide range of strain rates. Specifically, the sensor according to one embodiment of the present disclosure has a satisfactory gauge factor (GF) value in the range of 13 or more, preferably 14 to 19, at strain rates in a range of 0 to 900%, and exhibits high sensitivity.

Hereinafter, the present disclosure will be described in detail by examples and comparative examples. The examples below are only intended to aid understanding of the present disclosure, and the scope of the present disclosure is not limited by the examples below.

Examples

1. Synthesis of Zn-MOF

Trimethic acid (1,3,5-benzenetricarboxylic acid, TMA) was selected as an organic linker, and $Zn(NH_3)_2$ was used as a zinc precursor. 3 g of $Zn(NH_3)_2$ was dissolved in 60 ml of a solvent containing water, DMF, and ethanol mixed at a volume ratio of 1:1:1. Afterwards, 1.5 g of TMA was added to the mixture, stirred at room temperature for 30 minutes, placed in an autoclave, and heat-treated at a temperature of 120° C. for 12 hours. The white crystals generated after heat treatment were separated, washed several times with ethanol and water, filtered, and vacuum-dried to prepare Zn-MOF.

2. Preparation of MOF Hydrogel 0.6 g of ethyl hexadecyl dimethyl ammonium bromide (EHDDAB), a cationic surfactant, and 0.2 g of NaCl were added to 10 ml of distilled water and dissolved by stirring at a speed of 600 rpm at a temperature of 50° C. After lowering the temperature of the prepared solution to room temperature, 0.2 ml of dodecyl methacrylate (DDMA), which was a hydrophobic monomer, was added and stirred for an additional 20 minutes to prepare a solution containing micelles with acrylic monomers trapped inside the micelles.

The previously prepared Zn-MOF was added to the prepared solution in amounts of 0 mg (Z0), 10 mg (Z1), 20 mg (Z2), 30 mg (Z3), and 40 mg (Z4), respectively, and then was stirred at a speed of 1200 rpm and completely dispersed. Next, 1.9 g of acrylamide, 100 µl of 2-(dimethylamino)ethyl acrylate methochloride (DMAEMC), which was a cationic monomer, and 50 mg of ammonium per sulfate (APS) were added to the reactor and stirred until the solution was homogeneous. Afterward, 5 µl of tetra methyl ethylene diamine (TEMED) was added to the reactor and stirred for additional 30 seconds. Lastly, the mixed solution was transferred to a plastic mold, the temperature was raised to 50° C., and the reaction was performed for 1 hour. Samples were prepared by cooling to ambient air temperature and removing the mold.

Determination of Mechanical Properties of Samples

Figure 1:
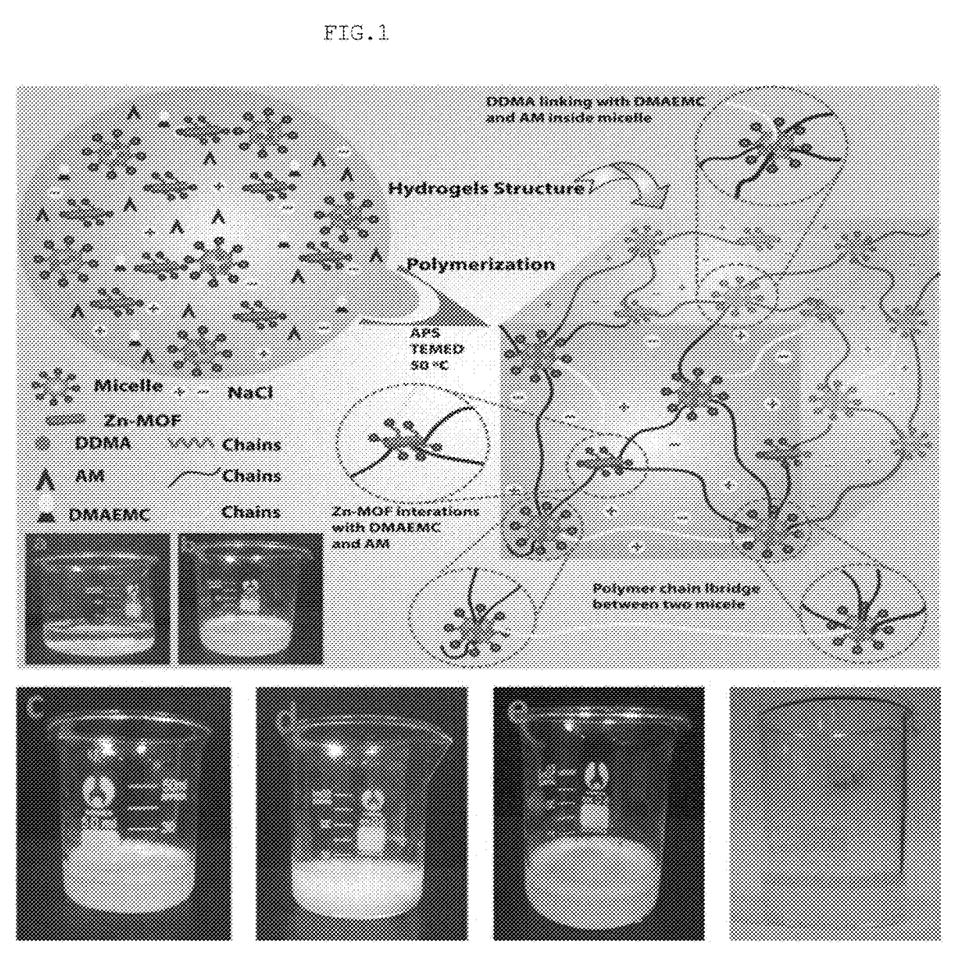
Figure 2:
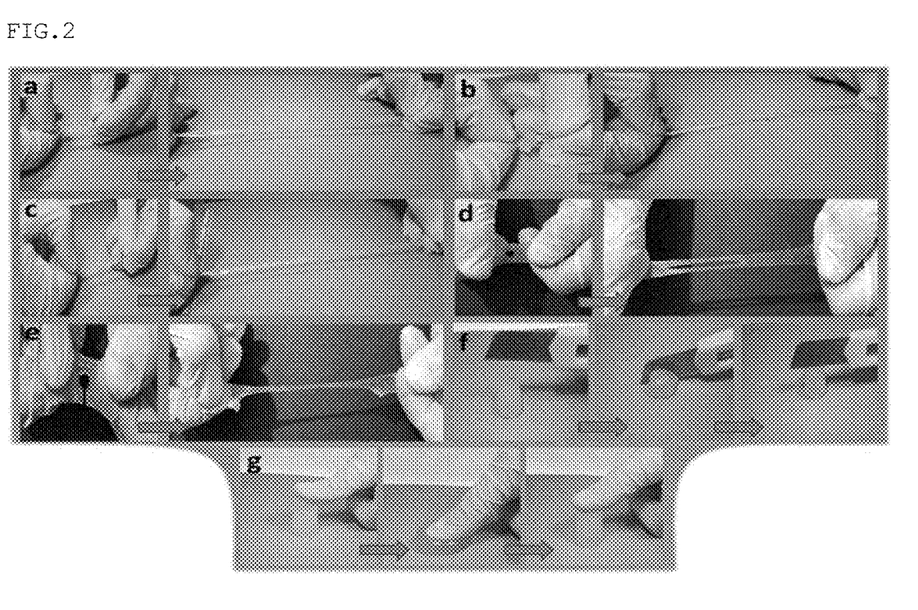

FIG. 2 shows the mechanical properties of the prepared sample observed with the naked eye. The sample used in FIG. 2 is Z2, and referring to A to C of FIG. 2, the Z2 sample exhibited excellent extensibility under various stretching and twisting conditions. Referring to D to F of FIG. 2, the prepared sample exhibited excellent cut resistance, and this resistance property could originate from the non-covalent bonding point. Referring to G of FIG. 2, the shape recovery properties of the hydrogel sample were confirmed, and it was confirmed that the original shape was restored after the force was removed even after having been completely pressed with the finger.

Figure 3:
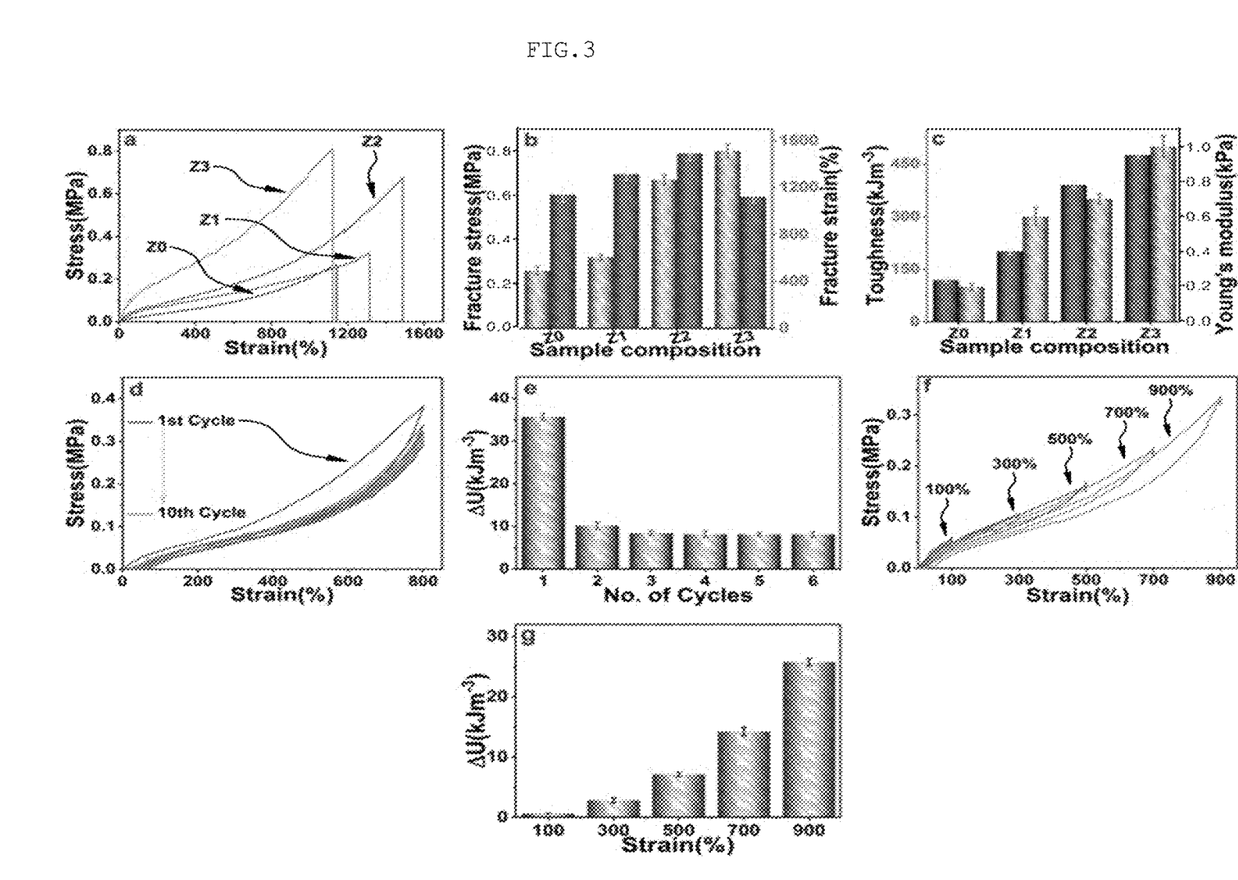

To quantitatively confirm the mechanical properties of each sample, toughness, and Young's modulus were evaluated using a universal testing machine (UTM), and the results are shown in FIG. 3. A of FIG. 3 shows the results of evaluating the tensile properties corresponding to the Zn-MOF content. It was confirmed that the Zn-MOF content had a significant effect on the tensile properties of the hydrogel. B of FIG. 3 and Table 1 below show the results of measuring the fracture stress and fracture strain of each sample.

Referring to B of FIG. 3 and Table 1, it was confirmed that as the content of Zn-MOF increased, the fracture stress increased, but the fracture strain rates decreased in Z3. This illustrated that the sample with a Zn-MOF content of 20 mg showed the best mechanical performance.

C of FIG. 3 and Table 1 displayed the toughness and Young's modulus values determined at a 75% strain rate of each sample. The toughness and Young's modulus increased linearly as the Zn-MOF content increased. This illustrated that the Zn-MOF affected the mechanical performance of the hydrogel.

TABLE 1

| Sample Name | Fracture Stress (MPa) | Fracture Strain Rates (%) | Toughness (kJm$^{-3}$) | Young's modulus (kPa) |
|---|---|---|---|---|
| Z0 | 0.26. | 1139. | 119. | 0.2. |

TABLE 1-continued

| Sample Name | Fracture Stress (MPa) | Fracture Strain Rates (%) | Toughness (kJm$^{-3}$) | Young's modulus (kPa) |
|---|---|---|---|---|
| Z1 | 0.32. | 1313. | 203. | 0.6. |
| Z2 | 0.67. | 1448. | 394. | 0.7. |
| Z3 | 0.8. | 1121. | 475. | 1. |

Among these samples, Z2, which had the best mechanical performance, was selected and further experiments were conducted. Repetitive loading-unloading tests were performed to confirm fatigue performance, and initial tests were performed for 10 cycles at a constant strain rate of 800%. The energy dissipated in the first cycle was measured to be 35.7 kJ/m$^3$ at a stress value of 0.38 MPa, exceeding the dissipated energy of the subsequent nine cycles. Subsequent cycles showed a decrease in dissipated energy with values of 10.1 kJ/m$^3$ and 8.4 kJ/m$^3$ for the second and third cycles, respectively, and stress values for the second and third cycles were 0.34 MPa and 0.32 Mpa, respectively. The decreasing dissipated energy could be attributed to the alignment and physical entanglement of the polymer coils. After the third cycle, no significant changes were observed in the dissipated energy and stress.

Additional loading-unloading tests were performed at various strain rates, and the results are shown in F to G of FIG. 3. This illustrated that the energy dissipated at a 100% strain rate was only 0.56 kJ/m$^3$ and there were no residual strain rates, showing high elasticity. With strain rates in a range of 0% to 100%, the extensibility of the hydrogels prepared behaved similarly to human skin's extensibility reaching up to 75%. The dissipated energy increased from 2.8 kJ/m$^3$ at a 300% strain rate to 25.7 kJ/m$^3$ at a 900% strain rate. Based on these results, it was confirmed that when the sample was stressed, the hydrogel network temporarily experienced cracks and recovered its original shape when the stress was relieved. This illustrated that reversible non-covalent interactions existed within the hydrogel network.

Determination of Rheological Properties

Figure 4:
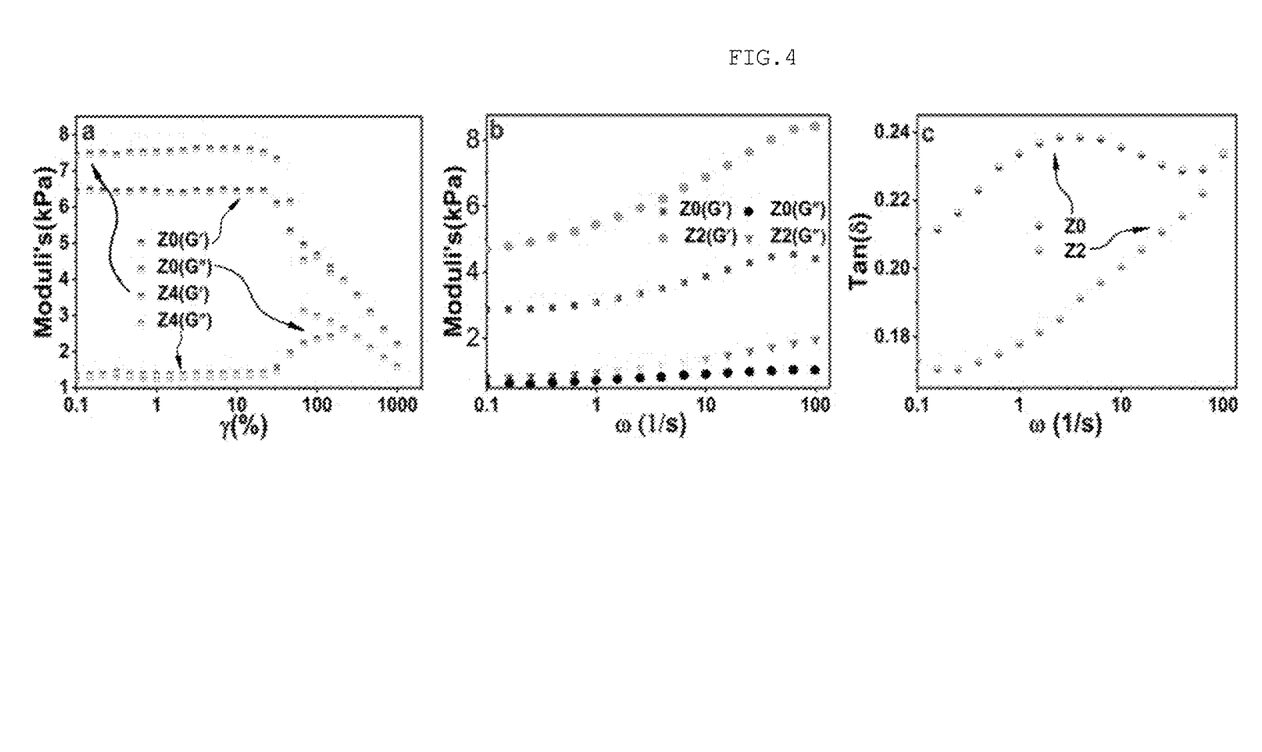

Rheological properties were studied at a constant temperature of 25° C. and a straining test was conducted at strain rates in a range between 0.01% and 1000% at a fixed frequency of 10 rad/s. The strain-dependent viscoelasticity of the two hydrogels Z0 and Z2 is shown in FIG. 4. The response of both hydrogels was linear at strain rates in a range of 0.01% to 21%, and within this range, the loss of storage modulus (G') was greater than the loss of modulus (G"). This behavior revealed the viscoelastic properties of the hydrogels, and B of FIG. 4 showed the frequency dependence of the hydrogels in the frequency range of 0.1 rad/s to 100 rad/s. In this case, the G' value of Z2 was higher than the G' value of Z0, which suggested that Zn-MOF contributed to more cross-linking within the hydrogel network and that these cross-linking points improved G' in Z2. C of FIG. 4 showed the attenuation coefficient (tan δ) and also showed that the attenuation coefficient of Z0 was high in all frequency ranges, indicating that Z2 behaved more elastically than Z0. This meant that Zn-MOF exhibited frequency-dependent viscoelastic behavior, and tan δ decreased at low frequencies. However, the elastic properties appeared to be slightly less pronounced at high frequencies due to the increase in tan δ values. Rheological analysis showed that the Zn-MOF was successfully incorporated into the hydrogel network, adding the number of cross-linking sites between the polymer chains of Zn-MOF and the surfactant, resulting in improved rheological properties of the hydrogel.

Determination of Conductivity and Strain Sensitivity

Figure 5:
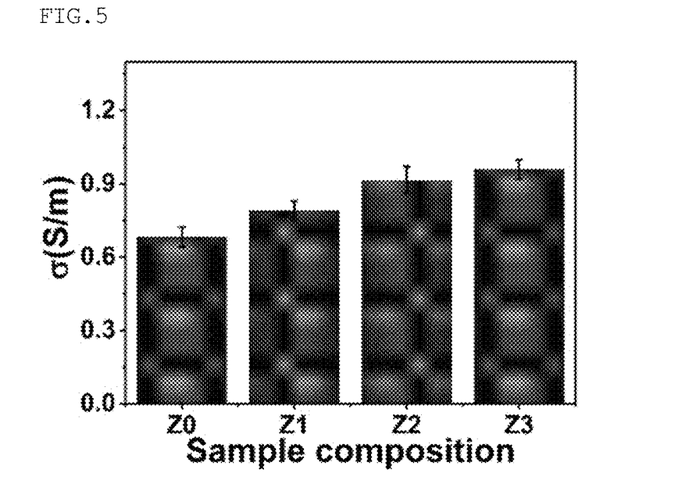
FIG. 5 illustrates the results of measuring the electrical conductivity of the conductive hydrogel according to an embodiment of the present disclosure.

The electrical conductivity of the prepared hydrogel was measured and the results are shown in FIG. 5. Referring to FIG. 5, Z0, which did not contain Zn-MOF, also exhibited electrical conductivity, which was mainly due to sodium ions and chloride ions. In addition, as the concentration of Zn-MOF increased, the electrical conductivity increased, confirming that Zn-MOF was directly related to electrical conductivity. Specifically, in the case of the Z2 sample, it was confirmed that the electrical conductivity satisfied the range of 0.85 S/cm to 1 S/cm.

Figure 6:
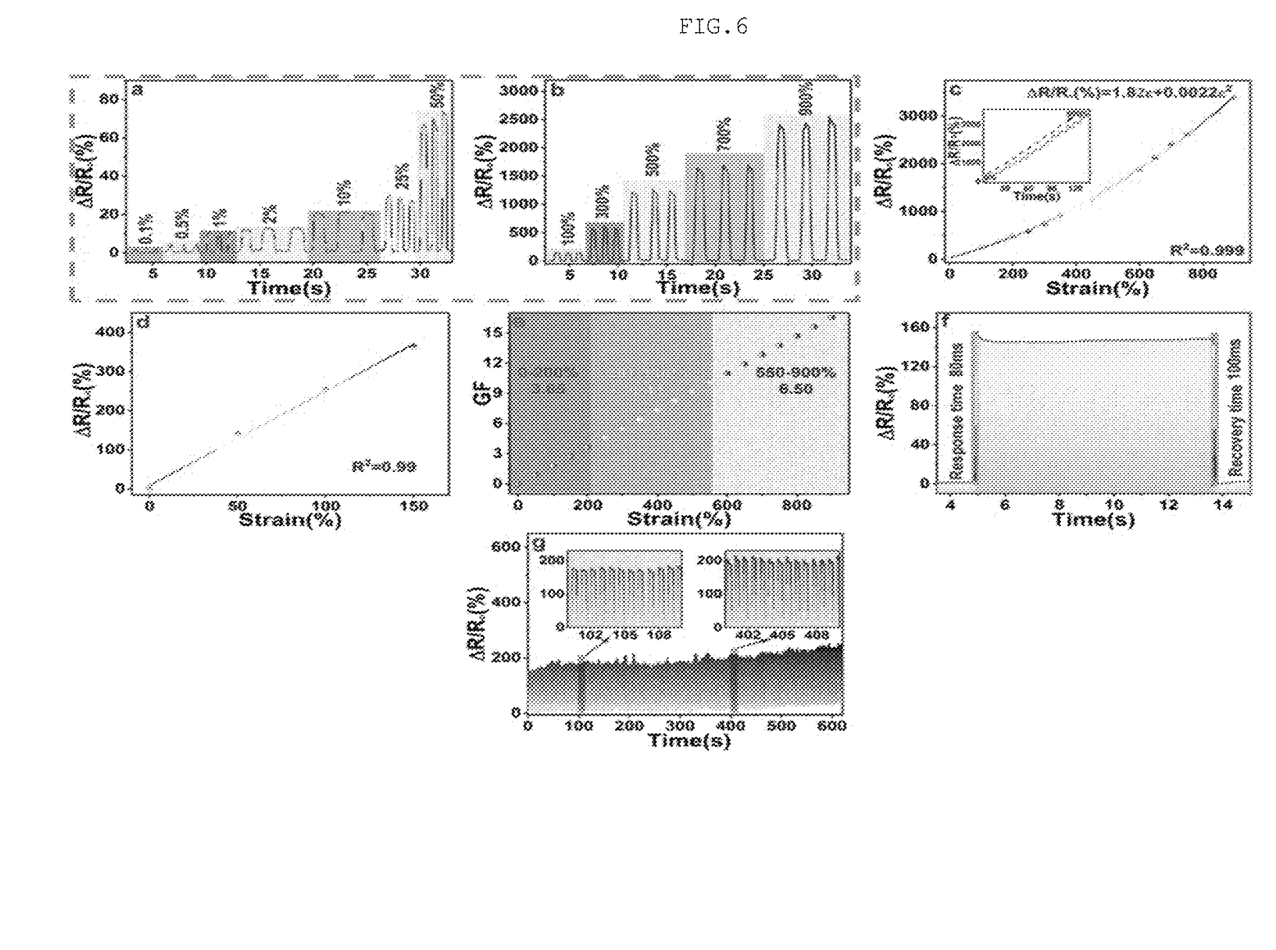

The deformation performance of the hydrogel was further analyzed and shown in FIG. 6. A of FIG. 6 showed the results confirming that low strain rates in a range of 0.1% to 50% could be detected. This illustrated that the hydrogel showed high sensitivity. As shown in B of FIG. 6, high strain rates ranging from 100% to 900% could also be detected.

The sensitivity of this hydrogel was further confirmed through gauge factor (GF), and GF was measured according to the range of the strain rates, and the results are shown in C to E of FIG. 6. GF was calculated using the relative resistance equation $\Delta R/Ro=1.82\varepsilon+0.0022\varepsilon^2$. Here, $\Delta R/Ro$ is the relative resistance and ε is the applied strain rates. The GF value was found to be 3.65 at strain rates in a range of 0% to 200% and to be 6.50 at strain rates in a range of 201% to 550%. E of FIG. 6 showed a direct relationship between GF and strain rates. A total GF value was 16.65 at strain rates ranging from 0% to 900%. In addition, D of FIG. 6 showed a linear relationship between relative resistance and strain rates with an $R^2$ value of 0.99, and these results suggested that the prepared hydrogel could be used as artificial skin, considering that the elasticity of the human epidermis was at 75%. The reaction and recovery times were recorded through stretching and loosening and are shown in F of FIG. 6. The hydrogel of the sample showed a fast reaction time of 80 ms and a recovery time of 100 ms. Fatigue performance is shown in G of FIG. 6 and was evaluated by performing more than 700 cycles of stretching and release. Referring to g in FIG. 6, it was confirmed that the hydrogel network exhibited high stability even after repeated stretching and release. This illustrated that the hydrogel of the sample had high conductivity, fast response recovery times, excellent fatigue performance, and wide deformation sensitivity.

Application to Epidermal Sensors

Figure 7:
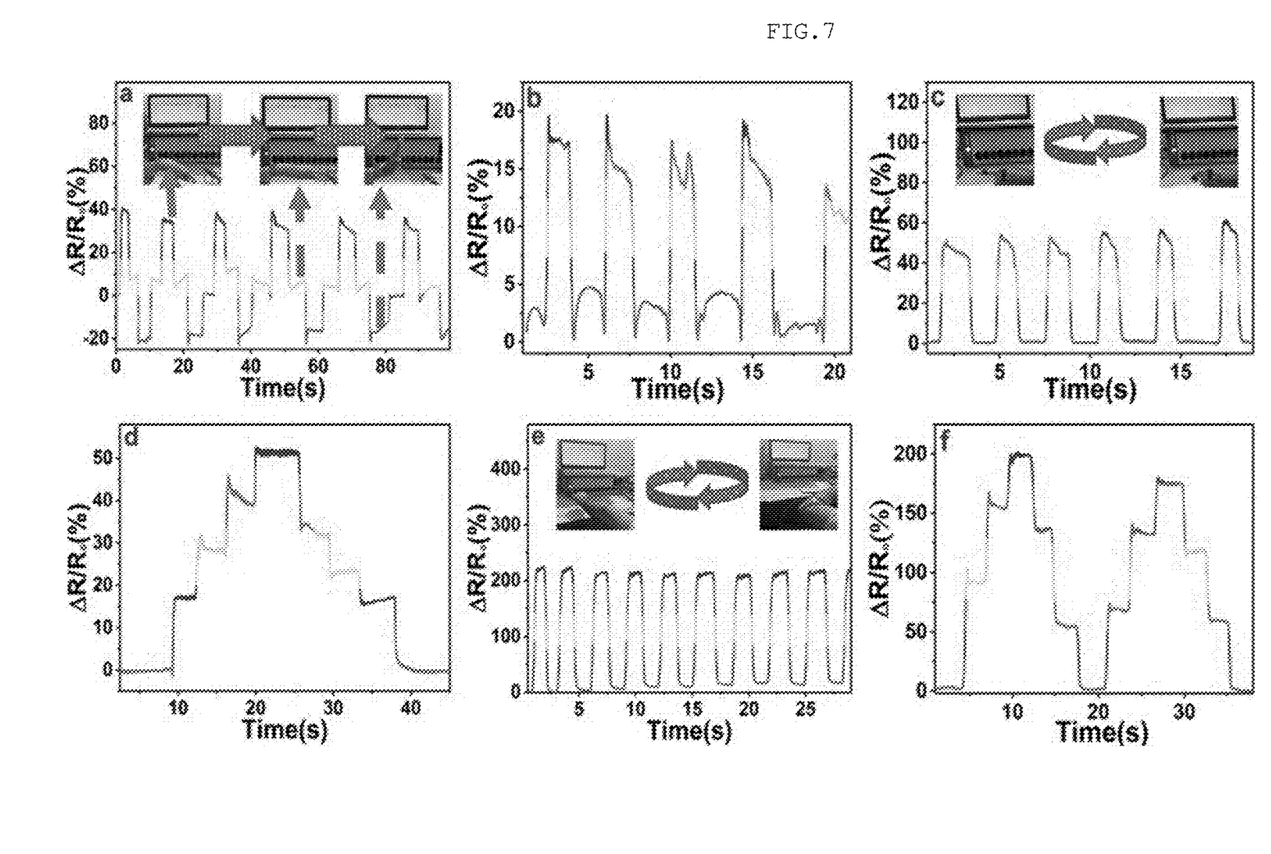

To monitor human movements by applying a prepared hydrogel to an actual epidermal sensor, the prepared hydrogel was applied to the wrist, neck, fingers, and elbow. The sensor was manufactured by covering the prepared hydrogel strip with a copper sheet, and the hydrogel was attached to various body areas using an adhesive agent. Copper wires were connected to an electrochemical workstation. First, the results of the experiment after attaching the hydrogel to the wrist are shown in A of FIG. 7, and it was confirmed that various movements of the wrist were successfully detected. B of FIG. 7 showed the response to neck flexion movement by attaching the hydrogel to the neck, C of FIG. 7 for finger movement at a single angle, D of FIG. 7 for finger movement at various angles, E of FIG. 7 for elbow movement at a single angle, and F of FIG. 7 for elbow movement at various angles. Referring to FIG. 7, it was confirmed that the sensor enabled to detect movements such as complex bending of fingers and elbows at various angles, and the sensor had high reliability in monitoring human motion.

Figure 8:
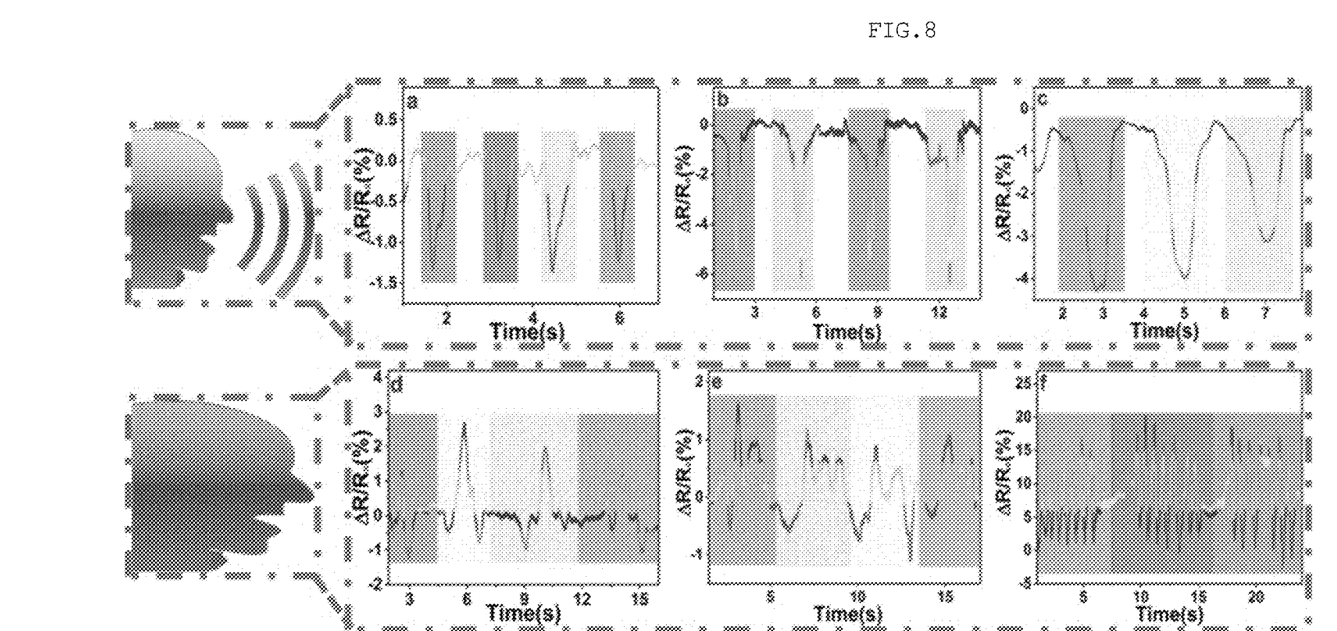

After attaching the manufactured hydrogel sensor to the neck, it was confirmed whether small movements could be monitored, and the results are shown in FIG. 8. The sensor sensitivity during physiological activities was displayed such as saying the word "one" in A of FIG. 8, coughing in B of FIG. 8, and whistling in C of FIG. 8. It was confirmed that human activities could be clearly distinguished by accurately responding to various physiological activities. Likewise, it was confirmed that similar but distinct physiological activities such as swallowing saliva in D of FIG. 8, drinking water in E of FIG. 8, and chewing bubble gum in E of FIG. 8 could be distinguished.

Figure 9:
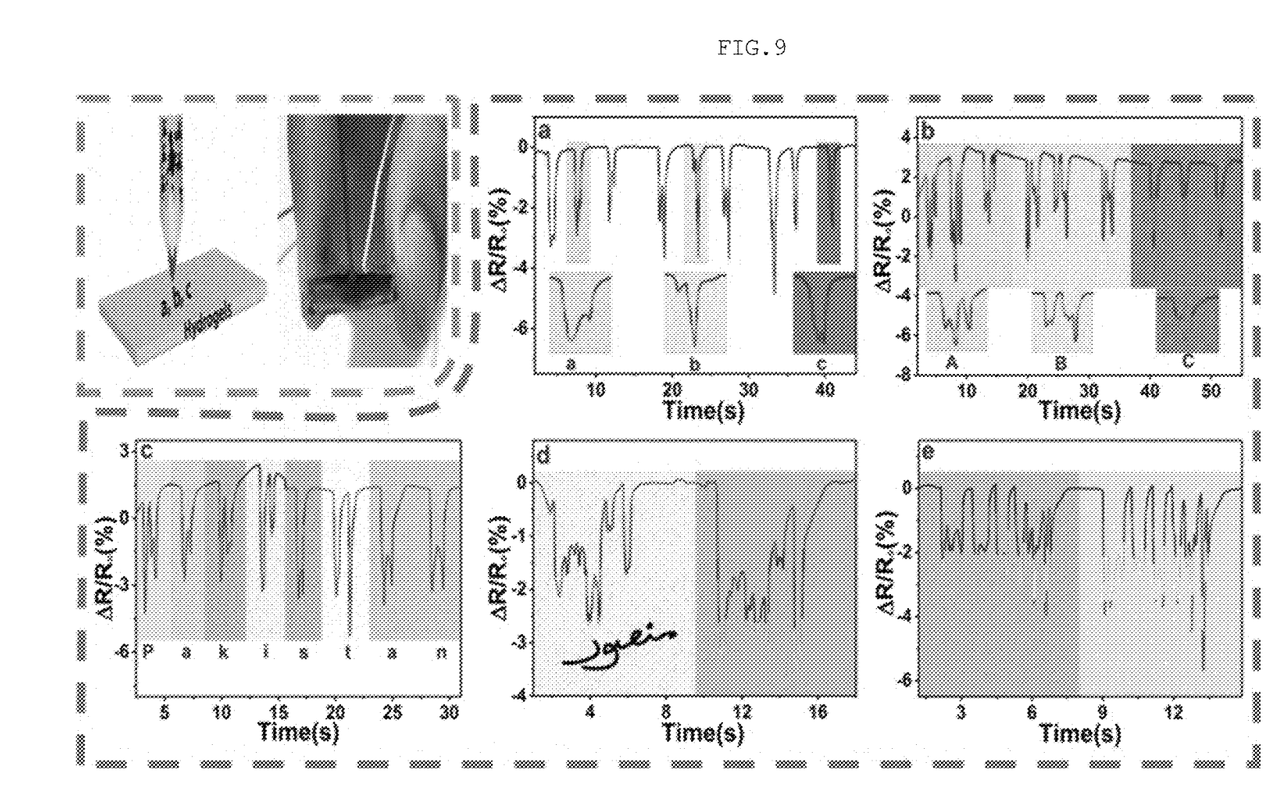

FIG. 9 shows the results of measuring the sensitivity of the hydrogel to writing. After manufacturing the sensor by sandwiching the hydrogel between two copper electrodes and connecting the sensor to the measuring equipment, the English alphabet was written on the sample and the sensor measurement results were compared. Referring to FIG. 9, it was confirmed that the hydrogel sensor not only responded to different English alphabets such as a, b, and c, but also showed the same response to repetition of the alphabets, and also distinguished between upper case and lower case letters. Through this, it was confirmed that the Zn-MOF-based hydrogel sensor had an excellent ability to detect and distinguish various letters, languages, and signatures, and the hydrogel could be applied to various electronic devices such as mobiles and touch panels.

Application to Artificial Skin Sensor

Figure 10:
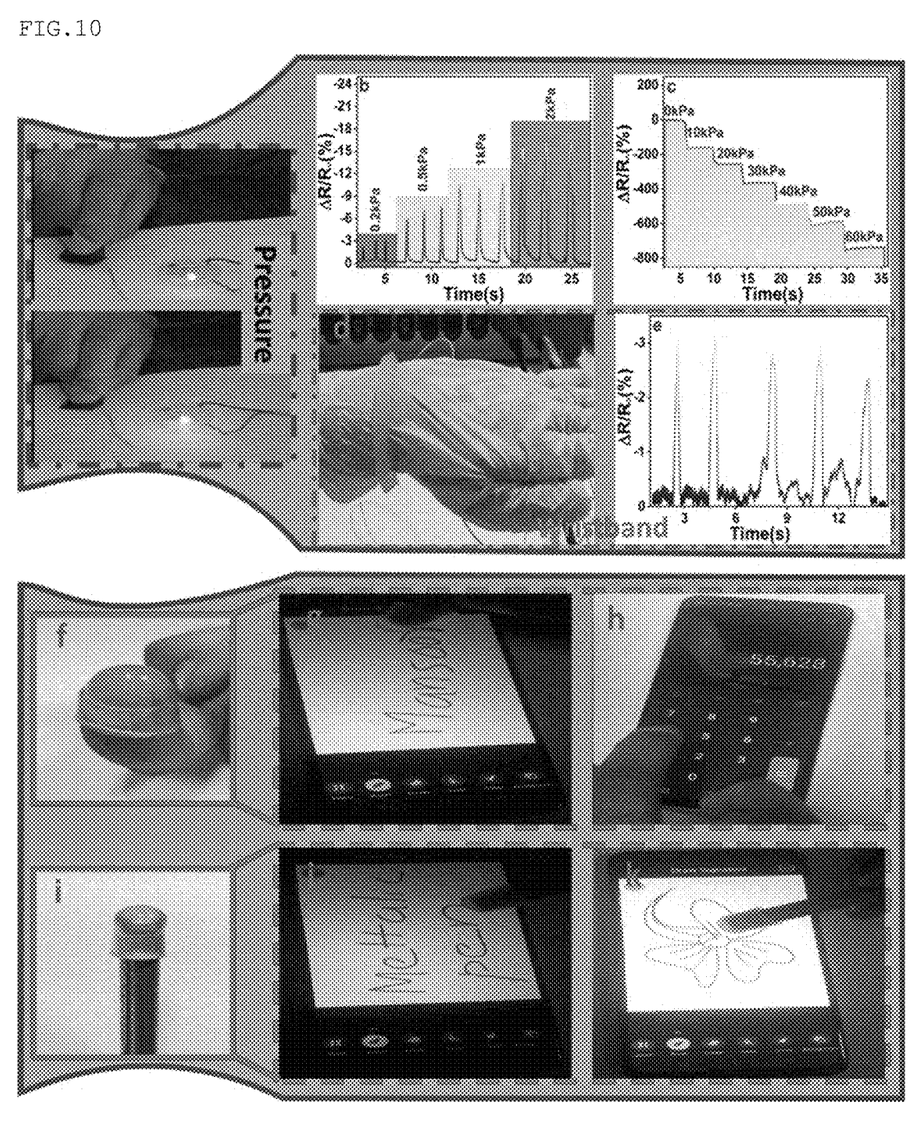

FIG. 10 shows the results when the Z2 hydrogel was applied to an artificial skin sensor. A of FIG. 10 shows that the brightness of the LED was controlled in response to the pressure applied to the hydrogel sample, and B of FIGS. 10 and 110C show that the hydrogel sample's resistance was inversely proportional to the magnitude of the pressure. D to E of FIG. 10 show the results of tests in which a wearable wristband was manufactured and then used to monitor subtle touches of a finger. This illustrated that the hydrogen sample could be applied to various wearable devices. FIGS. 10F to 10K show an investigation of the characteristics of the artificial skin. It was confirmed that the hydrogel sample interacted smoothly and quickly with the mobile screen and enabled activities such as precise writing and drawing.

What is claimed is:

1. A conductive hydrogel comprising:
   a micelle with an acrylic monomer trapped inside the micelle; and
   a metal-organic framework/surfactant composite.

2. The conductive hydrogel of claim 1, wherein the conductive hydrogel has an acrylic bond.

3. The conductive hydrogel of claim 1, wherein the conductive hydrogel has a structure in which a hydrogel chain and the acrylic monomer inside the micelle are polymerized.

4. The conductive hydrogel of claim 3, wherein the acrylic monomer inside the micelle contains an alkyl group having 6 to 20 carbon atoms.

5. The conductive hydrogel of claim 1, wherein the metal-organic framework comprises a metal ion and an organic linker, and
   the organic linker has a hydrogel binding structure and an electrostatic attraction force.

6. The conductive hydrogel of claim 1, wherein the conductive hydrogel has an electrical conductivity of 0.8 S/cm or more.

7. A sensor comprising the conductive hydrogel of claim 1.

8. The sensor of claim 7, wherein the sensor has a gauge factor (GF) value in a range of 13 or more at strain rates ranging from 0% to 900%.

* * * * *